(12) United States Patent
Goebel et al.

(10) Patent No.: US 9,453,502 B2
(45) Date of Patent: Sep. 27, 2016

(54) METALLIC WALL HALL THRUSTERS

(71) Applicants: Dan Michael Goebel, Tarzana, CA (US); Richard Robert Hofer, Monrovia, CA (US); Ioannis G. Mikellides, Valencia, CA (US)

(72) Inventors: Dan Michael Goebel, Tarzana, CA (US); Richard Robert Hofer, Monrovia, CA (US); Ioannis G. Mikellides, Valencia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 575 days.

(21) Appl. No.: 13/768,788

(22) Filed: Feb. 15, 2013

(65) Prior Publication Data

US 2014/0053531 A1 Feb. 27, 2014

Related U.S. Application Data

(60) Provisional application No. 61/599,174, filed on Feb. 15, 2012.

(51) Int. Cl.
*B64G 1/40* (2006.01)
*F03H 1/00* (2006.01)

(52) U.S. Cl.
CPC .............. *F03H 1/0012* (2013.01); *B64G 1/405* (2013.01); *F03H 1/0037* (2013.01); *F03H 1/0062* (2013.01); *F03H 1/0068* (2013.01); *F03H 1/0075* (2013.01)

(58) Field of Classification Search
CPC ... B64G 1/405; F03H 1/0037; F03H 1/0062; F03H 1/0068; F03H 1/0075
See application file for complete search history.

(56) References Cited

U.S. PATENT DOCUMENTS

| 6,208,080 | B1 | 3/2001 | King et al. | |
|---|---|---|---|---|
| 7,500,350 | B1 | 3/2009 | Jacobson et al. | |
| 2002/0116915 | A1* | 8/2002 | Hruby et al. | 60/202 |
| 2005/0086926 | A1* | 4/2005 | King | 60/202 |
| 2013/0026917 | A1* | 1/2013 | Walker et al. | 315/85 |

FOREIGN PATENT DOCUMENTS

WO WO2010133802 A1 * 11/2010 .............. F03H 1/00

OTHER PUBLICATIONS

Mikellides et al "Magnetic Shielding of the acceleration channel walls in a long life hall thruster", 2010, 46th AIAA/ASME/SAE/ASEE Joint Propulsion Conference & Exhibit Jul. 25-28, 2010, Nashville, TN.*
Coors Tek and Ceramic Industries "Materials properties charts", 2013, https://web.archive.org/web/20130701201335/http://www.ceramicindustry.com/ext/resources/pdfs/2013-CCD-MaterialCharts.pdf.*
Omega.com "Table of Emissivity Values", 2004, https://web.archive.org/web/20040125054311/http://ib.cnea.gov.ar/~experim2/Cosas/omega/emisivity.htm.*

(Continued)

*Primary Examiner* — Phutthiwat Wongwian
*Assistant Examiner* — William Breazeal
(74) *Attorney, Agent, or Firm* — Steinfl & Bruno LLP

(57) ABSTRACT

A Hall thruster apparatus having walls constructed from a conductive material, such as graphite, and having magnetic shielding of the walls from the ionized plasma has been demonstrated to operate with nearly the same efficiency as a conventional non-magnetically shielded design using insulators as wall components. The new design is believed to provide the potential of higher power and uniform operation over the operating life of a thruster device.

10 Claims, 16 Drawing Sheets

(56) References Cited

OTHER PUBLICATIONS

HTW "Germany Glassy Carbon", 2006, https://web.archive.org/web/20061101215745/http://www.htw-germany.com/technology.php5?lang=en&nav0=2.*

Ahedo, E. "Presheath/sheath model with secondary electron emission from two parallel walls" Physics of Plasmas, vol. 9, No. 10, pp. 4340-4347, Oct. 2002.

Ahedo, E. et al. "Fulfillment of the kinetic Bohm criterion in a quasineutral particle-in-cell model" Physics of Plasmas, vol. 17, 073507, 14 pages, 2010.

Ahedo, E. et al. "Partial trapping of secondary-electron emission in a Hall thruster plasma" Physics of Plasmas, vol. 12, 073503, 9 pages, 2005.

Bareilles, J. et al. "Critical assessment of a two-dimensional hybrid Hall thruster model: Comparisons with experiments" Physics of Plasmas, vol. 11, No. 6, pp. 3035-3046, Jun. 2004.

Barral, S. et al. "Wall material effects in stationary plasma thrusters. II. Near-wall and in-wall conductivity" Physics of Plasmas, vol. 10, No. 10, pp. 4137-4152, Oct. 2003.

Boeuf, J. P., and Garrigues, L., "Low Frequency Oscillations in a Stationary PlasmaThruster," *Journal of Applied Physics* vol. 84, No. 7, pp. 3541-3554, Oct. 1, 1998.

Bohm, D. et al., "Chapter 3: Minimum Ionic Kinetic Energy for a Stable Sheath" Characteristics of Electrical Discharges in Magnetic Fields McGraw-Hill, New York, p. 77-86, 1949.

Boniface, C. et al. "Anomalous cross field electron transport in a Hall effect thruster" Applied Physics Letters, vol. 89, 161503, 5 pages, 2006.

Braginskii, S. I., "Transport Processes in Plasmas," *Reviews of Plasma Physics*, vol. 1, Consultants Bureau, New York, pp. 205-311. 1965.

Brown, D. L., et al., "Analytical Extraction of Plasma Properties Using a Hall Thruster Efficiency Architecture," 30th International Electric Propulsion Conference, IEPC Paper 2007-188, Florence, Italy, 15 pages. 2007.

Courtney, D. et al. "Continued Investigation of Diverging Cusped Field Thruster" $44^{th}$ AIAA/ASME/SAE/ASEE Joint Propulsion Conference & Exhibit, 13 pages, Jul. 21-23, 2008.

Dimits, A. M., "Fluid Simulations of Tokamak Turbulence in Quasiballooning Coordinates," *Physical Review E*, vol. 48, pp. 4070-4079, Nov. 1993.

Ducrocq, A. et al. "High-frequency electron drift instability in the cross-field configuration of Hall thrusters" Physics of Plasmas, vol. 13, 102111, 10 pages, 2006.

Fernandez, E., et al., "2-D simulations of Hall thrusters," in *CTR Annual Research Briefs*. Palo Alto, CA: Stanford Univ., p. 81-90, 1998.

Fife, J. M., et al. "Hybrid-PIC Modeling and Electrostatic Probe Survey of Hall Thrusters," Ph.D. Thesis, Aeronautics and Astronautics, Massachusetts Institute of Technology, 1998. 12 pages.

Gamero-Castafio, M. And Katz, I., "Estimation of Hall Thruster Erosion Using HPHall," 29th International Electric Propulsion Conference, Princeton, NJ, 11 pages, Oct. 31-Nov. 4, 2005.

Garrigues, L. et al. "Anomalous conductivity and secondary electron emission in Hall effect thrusters" Journal of Applied Physics, vol. 100, 123301, 11 pages, 2006.

Grys, K. et al., "4.5 kW Hall Thruster System Qualification Status" AIAA Paper No. 05-3682, 11 pages, Jul. 10-13, 2005.

Grys, K. et al., "Demonstration of 10,400 Hours of Operation on a 4.5 kW Qualification Model Hall Thruster" AIAA Paper No. 10-6698, 11 pages, Jul. 25-28, 2010.

Hagelaar, G. et al. "Two-dimensional model of a stationary plasma thruster" Journal of Applied Physics, vol. 91, No. 9, pp. 5592-5598, May 1, 2002.

Hirakawa, M. "Electron Transport Mechanism in a Hall Thruster," 25th International Electric Propulsion Conference, IEPC Paper 1997-021, Cleveland, OH, 1997. 9 pages.

Hirakawa, M., et al. "Numerical Simulation of Plasma Particle Behavior in a Hall Thruster," 32nd AIAA Joint Propulsion Conference, AIAA Paper 1996-3195, Lake Buena Vista, FL, 1996. 8 pages.

Hirakawa, M., et al. "Particle Simulation of Plasma Phenomena in Hall Thrusters," 24th International Electric Propulsion Conference, IEPC Paper 1995-164, Moscow, Russia, 1995. 9 pages.

Hobbs, G. D. et al. "Heat Flow Through a Langmuir Sheath in the Presence of Electron Emission," *Plasma Physics*, vol. 9, pp. 85-87, 1967.

Hofer, R, et al., "Evaluation of a 4.5 kW Commercial Hall Thruster System for NASA Science Missions" AIAA Paper No. Jun. 4469, 27 pages, Jul. 9-12, 2006.

Hofer, R. et al. "BPT-4000 Hall Thruster Discharge Chamber Erosion Model Comparison with Qualification Life Test Data" IEPC-2007-267, $30^{th}$ International Electric Propulsion Conference, Florence, Italy, 24 pages, Sep. 17-20, 2007.

Hofer, R. et al. "BPT-4000 Hall Thruster Extended Power Throttling Range Characterization for NASA Science Missions" IEPC-2009-085, $31^{st}$ International Electric Propulsion Conference, Ann Arbor, MI, 22 pages. Sep. 20-24, 2009.

Hofer, R., et al., "Efficacy of Electron Mobility Models in Hybrid-PIC Hall Thruster Simulations," 44th AIAA Joint Propulsion Conference, AIAA Paper 2008-4924, Hartford, CT, 30 pages, Jul. 21-23, 2008.

Hofer, R., et al., "Wall Sheath and Electron Mobility Modeling in Hybrid-PIC Hall Thruster Simulations," 43rd AIAA Joint Propulsion Conference, AIAA Paper 2007-5267, Cincinnati, OH. pp. 2632-2646, 2007.

Huang, W., et al., "Laser-Induced Fluorescence of Singly-Charged Xenon Inside a 6-kW Hall Thruster," 45th AIAA Joint Propulsion Conference, AIAA Paper 2009-5355, Denver, CO, 24 pages, Aug. 2-5, 2009.

Kamhawi, H. et al., "In-Space Propulsion High Voltage Hall Accelerator Development Project Overview"AIAA Paper No. 09-5282, Denver, CO, 13 pages, Aug. 2-5, 2009.

Kamhawi, H. et al., JANNAF, Proceedings of the Sixth MSS, Fourth LPS, Third SPS Joint JANNAF Meeting, Orlando, FL Chemical Propulsion Information Analysis Center, Columbia, MD, 2008, Paper No. SPS-III-11.

Katz, I. et al. "Ion Current in Hall Thrusters" IEEE Transactions on Plasma Science, vol. 36, No. 5, pp. 2015-2024, Oct. 2008.

Katz, I. et al. "Neutral gas free molecular flow algorithm including ionization and walls for use in plasma simulations" Journal of Computational Physics, vol. 230, pp. 1454-1464, 2011.

Katz, I., and Mikellides, I. G., "A New Algorithm for the Neutral Gas in the Free-Molecule Regimes of Hall and Ion Thrusters," 31st International Electric Propulsion Conference, IEPC Paper 2009-95, Ann Arbor, MI, 10 pages, 2009.

Keidar, M., Boyd, I. D., and Beilis, I. I., "Plasma Flow and Plasma-Wall Transition in Hall Thruster Channel," *Physics of Plasmas*, 8, 12, pp. 5315-5322, 2001.

Kornfeld, G. et al. "Physics and Evolution of HEMP-Thrusters" $30^{th}$ IEPC, Florence Italy, 19 pages, Sep. 17-20, 2007.

Lazurenko, A. et al. "Determination of the electron anomalous mobility through measurements of turbulent magnetic field in Hall thrusters" Physics of Plasmas, vol. 14, 033504, 13 pages, 2007.

LeBrun, M. J., et al., "Toroidal Effects on Drift Wave Turbulence," *Physics of Fluids B*, vol. 5, No. 3, pp. 752-773, Mar. 1993.

Lin, Z., et al., "Turbulent Transport Reduction by Zonal Flows: Massively Parallel Simulations," *Science*, vol. 281, pp. 1835-1837, 1998.

Marchand, R. et al. "CARRE: a quasi-orthogonal mesh generator for 2D edge plasma modelling" Computer Physics Communications, vol. 96, pp. 232-246, 1996.

Marchand, R., et al., "Unstructured Meshes and Finite Elements in Space Plasma Modelling: Principles and Applications," in *Advanced Methods for Space Simulations*, Tokyo, pp. 111-143, 2007.

McDonald, M. et al. "Cathode position and orientation effects on cathode coupling in a 6-kW Hall Thruster" $31^{st}$ IEPC, Ann Arbor, MI, 11 pages, Sep. 20-24, 2009.

(56) References Cited

OTHER PUBLICATIONS

Mikellides, I. et al. "Wear Mechanisms in Electron Sources for Ion Propulsion, I: Neutralizer Hollow Cathode," *Journal of Propulsion and Power*, 24, 4, pp. 855-865, 2008.

Mikellides, I. et al. "Wear Mechanisms in Electron Sources for Ion Propulsion, II: Discharge Hollow Cathode," *Journal of Propulsion and Power*, 24, 4, pp. 866-879, 2008.

Mikellides, I. et al. "Hollow cathode theory and experiment. II. A two-dimensional theoretical model of the emitter region" Journal of Applied Physics, vol. 98, 113303, 15 pages, 2005.

Mikellides, I. et al. "Magnetic Shielding of the Acceleration Channel Walls in a Long-Life Hall Thruster" $46^{th}$ AIAA/ASME/SAE/ASEE Joint Propulsion Conference & Exhibit, 26 pages, Jul. 25-28, 2010.

Mikellides, I. et al. "Numerical Simulations of a Hall Thruster Hollow Cathode Plasma" IEPC-2007-018, $30^{th}$ IEPC, Florence Italy, 13 pages, Sep. 17-20, 2007.

Miller, J. S., et al., "Xenon Charge Exchange Cross Sections for Electrostatic Thruster Models," *Journal of Applied Physics*, vol. 91, No. 3, pp. 984-991, 2002.

Morozov A. et al. "Numerical Simulation of Plasma Flow Dynamics in SPT," 24th International Electric Propulsion Conference, IEPC Paper 1995-161, Moscow, Russia, 9 pages, 1995.

Morozov a. I., and Savelyev, V. V., "Fundamentals of Stationary Plasma Thruster Theory," *Reviews of Plasma Physics*, 21, p. 203-391, 2000.

Muller, A. "Experimental Cross Sections for Electron-impact Ionization and Electron-ion Recombination", Research Coordination Meeting, IAEA CRP, Vienna, 2 pages, Mar. 4-6, 2009.

Oh, D.Y. "Evaluation of Solar Electric Propulsion Technologies for Discovery-Class Missions" J. Spacecr. Rockets vol. 44, No. 2, 2007. pp. 399-411.

Parra, F. I., et al., "A Two-Dimensional Hybrid Model of the Hall Thruster Discharge," *Journal of Applied Physics*, vol. 100, 13 pages, Published online Jul. 26, 2006.

Pencil, E. et al. "End-of-Life Stationary Plasma Thruster Far-Field Plume Characterization" American Institute of Aeronautics and Astronautics, Inc. 29 pages, 1996.

Raitses, Y. et al. "Electron-wall interaction in Hall thrusters" Physics of Plasmas, vol. 12, 057104, 11 pages, 2005.

Reid, B. M. et al., "Langmuir Probe Measurements in the Discharge Channel of a 6-kW Hall Thruster," 44th AIAA Joint Propulsion Conference, AIAA Paper 2008-4920, Hartford, CT, 15 pages, 2008.

Reid, B. M., "The Influence of Neutral Flow Rate in the Operation of Hall Thrusters," Ph.D. Thesis, Aerospace Engineering, University of Michigan, 384 pages, 2009.

Riemann, K "The Bohm Criterion and Boundary Conditions for a Multicomponent System" IEEE Transactions on Plasma Science, vol. 23, No. 4, pp. 709-716, Aug. 1995.

Riemann, K "The Bohm criterion and sheath formation" J. Phys. D.: Appl. Phys. vol. 24, pp. 493-518, 1991.

Shastry, R., et al., "Method for Analyzing ExB Probe Spectra from Hall Thruster Plumes," *Review of Scientific Instruments*, 80, 063502, 13 pages. 2009.

Sommier, E. et al. "Simulating Plasma-Induced Hall Thruster Wall Erosion With a Two-Dimensional Hybrid Model" IEEE Transactions on Plasma Science, vol. 35, No. 5, pp. 1379-1387, Oct. 2007.

Taccogna, F. et al. "Plasma sheaths in Hall discharge" Physics of Plasmas, vol. 12, 093506, 16 pages, 2005.

Wirz R., et at "A Preliminary 2-D Computational Model of an Ion Thruster Discharge Chamber", 39th AIAA Joint Propulsion Conference, AIAA Paper 2003-5163, Huntsville, AL, 11 pages, 2003.

Wirz, R., "Discharge Plasma Processes of Ring-Cusp Ion Thrusters," Ph.D. Dissertation, Aeronautics, Caltech, Pasadena, CA, 240 pages. 2005.

\* cited by examiner

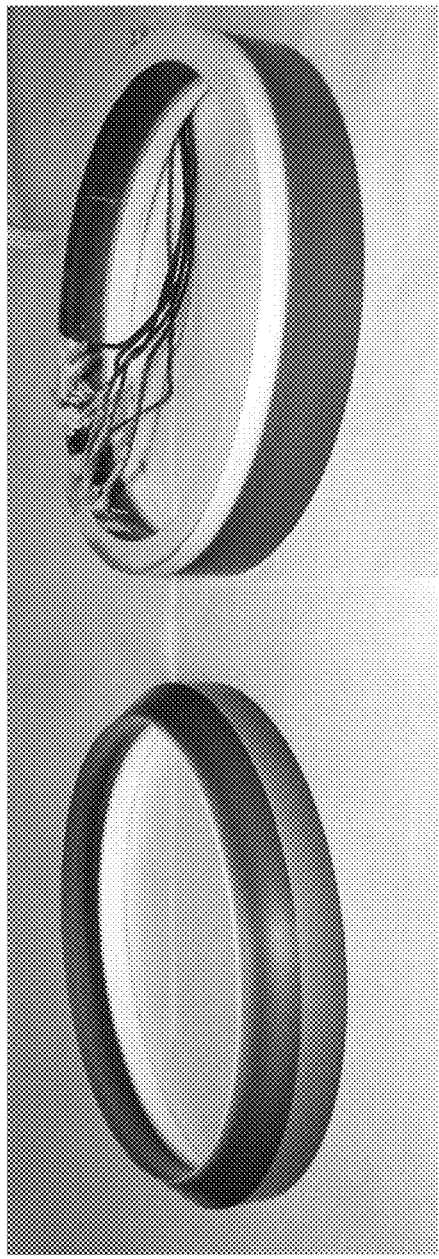

METALLIC WALL HALL THRUSTERS

CROSS-REFERENCE TO RELATED APPLICATIONS

This application claims priority to and the benefit of U.S. provisional patent application Ser. No. 61/599,174, filed Feb. 15, 2012, and priority to and the benefit of U.S. provisional patent application Ser. No. 61/745,041, filed Dec. 21, 2012, each of which applications is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

NOT APPLICABLE.

INCORPORATION-BY-REFERENCE OF MATERIAL SUBMITTED ON A COMPACT DISC

NOT APPLICABLE.

FIELD OF THE INVENTION

The invention relates to electric propulsion devices in general and particularly to Hall thrust devices.

BACKGROUND OF THE INVENTION

Hall thrusters generate thrust through the formation of an azimuthal electron current that interacts with an applied, quasi-radial magnetic field to produce an electromagnetic force on the plasma. These thrusters provide an attractive combination of thrust and specific impulse for a variety of near-earth missions and, in many cases, they allow for significant reductions in propellant mass and overall system cost compared to conventional chemical propulsion. The range of thrust and specific impulse attainable by Hall thrusters makes them applicable also to a variety of NASA science missions. Many such missions however require wider throttling and larger propellant throughput than near-earth applications. A critical risk associated with the application of Hall thrusters to science missions is their throughput capability. There are two major wear processes known to exist in Hall thrusters that can limit their applicability to such missions: erosion of the acceleration channel and erosion of the hollow cathode.

Multiple approaches have been pursued to reduce or eliminate this risk. For example, the high voltage, Hall accelerator (HiVHAc) incorporates an innovative discharge channel replacement technology as a means of extending its life. In 2008 the NASA-103M.XL version of HiVHAc accumulated more than 4,700 h at 700 V upon the completion of a wear test. More recently, a Qualification Life Test (QLT) of a different Hall thruster, the BPT-4000, was extended beyond 10,400 h. The BPT-4000 is nominally a 4.5-kW class thruster, and has fixed insulators and a magnetic design for high efficiency and long life. Post-test assessment of the wear data showed no measurable erosion of the acceleration channel walls from 5,600 h to 10,400 h indicating that the thruster reached an approximately "steady state" erosion configuration. The BPT-4000 QLT results were explained in a paper Mikellides, I. G., Katz, I., Hofer, R. R., and Goebel, D. M., de Grys, K., and Mathers, A., "Magnetic Shielding of the Channel Walls in a Hall Plasma Accelerator," Physics of Plasmas, Vol. 18, No. 3, 2011, p. 033501, which suggests that if properly designed, the life of Hall thrusters can be extended to (or exceed) that of ion thrusters thereby retiring the risk associated with their throughput capability.

The BPT-4000 QLT has exceeded significantly the requirements for most commercial or military missions. However, because many NASA science missions require longer operational times, higher throughput, and a wider range of operating conditions, a rigorous understanding of the erosion physics was needed.

From the observed erosion trends in the BPT-4000, it was recognized that to fully understand such physics one must account, at minimum, for the 2-D distribution of the electric field near the eroding surfaces, the sheath physics, and the local topology of the magnetic field. To account for all these physics, it is required usually that the solution to an extensive system of governing laws for the Hall thruster plasma is obtained, in two or three dimensions. The importance of understanding the erosion physics in such topologies motivated the development of a Hall thruster plasma solver named "Hall2De."

Hall2De is a 2-D computational solver of the laws that govern the evolution of the partially-ionized gas in Hall thrusters. The code is a descendant of OrCa2D, a 2-D computational model of electric propulsion hollow cathodes that employs a mix of implicit and explicit algorithms to solve numerically the plasma conservation laws in these devices. In Hall2De, excessive numerical diffusion due to the large disparity of the transport coefficients parallel and perpendicular to the magnetic field is evaded by discretizing the equations on a computational mesh that is aligned with the applied magnetic field. This magnetic field-aligned-mesh (MFAM) capability was largely motivated by the need to assess the life of Hall thrusters in complicated magnetic field topologies. A detailed description of the code has been provided by Mikellides, et al. (I. G. Mikellides, I. Katz, R. R. Hofer, and D. M. Goebel, Proceedings of the 31$^{st}$ International Electric Propulsion Conference, Ann Arbor, Mich. (Electric Rocket Propulsion Society, Fairview Park, Ohio, 2009), IEPC Paper No. 09-114).

There is a need for improved electric propulsion devices with greater throughput capabilities for many space applications.

SUMMARY OF THE INVENTION

According to one aspect, the invention features a Hall thruster having a conductive wall. The Hall thruster comprises an annular discharge chamber having a conductive wall and having a rear surface with an aperture defined therein, the conductive wall of the annular discharge chamber having a selected one of a wall shape, a profile and a cross section fabricated in accordance with a respective calculated wall shape, calculated profile, and calculated cross section deduced to be substantially a respective one of a wall shape, a profile and a cross section that would be present in the Hall thruster at an end of life operating state; an anode/gas distributor having an anode electrical terminal, the anode/gas distributor situated in the aperture defined in the rear surface of the annular discharge chamber, the anode/gas distributor having at least one inlet configured to receive an ionizable gas and configured to distribute the ionizable gas for use as a propellant; a cathode neutralizer configured to provide electrons, the cathode neutralizer having a cathode electrical terminal that can be connected to the anode electrical terminal by way of a power supply and a switch, the cathode neutralizer and the anode/gas distributor when operating generating an axial electrical field within the annular discharge chamber; and a magnetic circuit having a magnetic yoke, an inner magnetic coil and an outer magnetic coil, the magnetic circuit configured to be switchably powered by a power supply, the magnetic circuit configured to provide a substantially radial magnetic field across the annular aperture of the annular discharge chamber, the magnetic circuit configured to provide a magnetic field that provides magnetic shielding of the conductive wall of the annular discharge chamber from charged particles.

In one embodiment, the conductive wall comprises graphite.

In another embodiment, the conductive wall comprises a metal.

In yet another embodiment, the conductive wall comprises a form of carbon other than graphite.

In still another embodiment, the end of life operating state is a state that exists after at least 10,000 hours of operation.

In a further embodiment, the calculated wall shape, the calculated profile, and the calculated cross section is a respective calculated wall shape, calculated profile, and calculated cross section deduced using a code employing a magnetic field-aligned-mesh.

In still a further embodiment, the code employing a magnetic field-aligned-mesh comprises a Hall2De code.

In yet a further embodiment, the ionizable gas is a gas selected from the group of gases consisting of xenon, krypton and argon In still another embodiment, the ionizable gas comprises a vapor produced from an element selected from the group of elements consisting of bismuth, iodine, magnesium and zinc.

In an additional embodiment, the conductive wall is configured to provide higher emissivity than a wall having a respective one of the same wall shape, the same profile and the same cross section constructed from a non-conductor.

In one more embodiment, the conductive wall is configured to provide a wall of higher strength than a respective one of the same wall shape, the same profile and the same cross section constructed from a non-conductor.

In yet another embodiment, the rear surface of the annular discharge chamber is fabricated from graphite.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 11A is an image of an inner insulator ring from the baseline configuration, showing an eroded white region (~4 mm erosion band) at the edge of the ring.

FIG. 11B is an image of an inner insulator ring from the magnetically-shielded configuration showing a deposited black graphite conducting layer on the surface in contact with the plasma. The thruster performance was unaffected by the conducting rings, indicating that conducting walls, such as metallic walls or graphite walls, could be used.

DETAILED DESCRIPTION

Figure 1A:
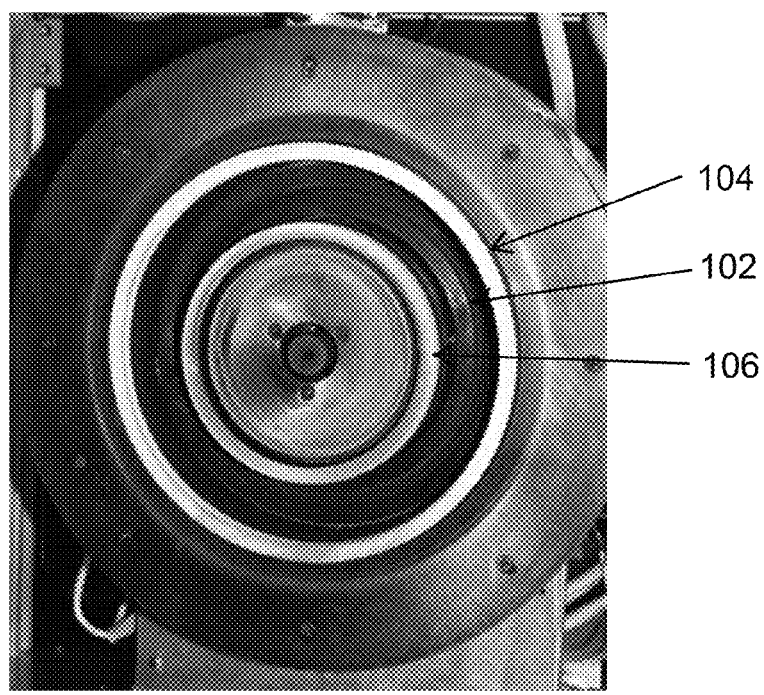
FIG. 1A is an image of a conventional Hall thruster.

We have demonstrated by reduction to practice the feasibility of a new concept intended to significantly reduce the cost and mass of Hall thrusters by replacing the dielectric discharge chamber walls normally used in Hall thrusters with simple, inexpensive, conductive materials such as graphite. This is enabled by the large reduction in the plasma-wall interactions discovered with a unique magnetic field configuration in the thruster called magnetic shielding. Magnetic shielding has been described in detail in co-pending U.S. provisional patent application Ser. No. 61/599,174, filed Feb. 15, 2012, and in co-pending U.S. provisional patent application Ser. No. 61/745,041, filed Dec. 21, 2012. It is believed that other conductive materials, such as stainless steel, or other metals, can also be used as the material of construction of the chamber walls.

Hall thrusters with magnetic shielding don't require the insulating features of ceramic (typically boron nitride) walls, and therefore can be fabricated and operated with electrically conducting walls without significantly impacting the thruster performance. This makes it simpler and less expensive to fabricate a thruster to survive launch loads. In addition, the graphite discharge chamber radiates more efficiently which increases the power capability of the thruster compared to conventional Hall thruster designs.

The magnetically shielded (MS) H6 Hall thruster design was retrofitted with new walls fabricated of graphite and then tested to compare the performance to previous thruster data obtained with standard Boron Nitride (BN) walls. The H6 Hall thruster is designed with replaceable "rings" near the thruster exit plane where the plasma contacts the walls to provide the ability to measure the erosion rate by removing the rings and measuring the surface on a precision coordinate measuring machine (CMM). Using a CMM, small rings of conducting-materials can be easily and quickly fabricated and tested. In a preferred embodiment, graphite is used as the material for the rings is because it features a very high emissivity to efficiently radiate any deposited power, and it has good strength and a reduced mass as compared to stainless steel. Nevertheless, in other embodiments, one might wish to use a conductor other than graphite as the material of construction, such as carbon in some other form, or another conductive material, such as a metal.

The H6 Hall thruster was tested with graphite walls at the nominal design (6 kW) power level for which this thruster was designed. As described hereinbelow, the graphite wall magnetically shielded H6 Hall thruster demonstrated performance nearly identical (within 2%) to the design with boron nitride walls, which successfully demonstrates the feasibility of this embodiment. This is a remarkable result because previous work in the US and France with graphite walls in Hall thrusters without magnetic shielding resulted in a reduction in the thruster efficiency and performance (thrust and Isp) by factors of about 2 compared to ceramic walls due to shorting out of the electric fields at the walls by the conductor. This performance degradation was avoided in the present invention because of the characteristics of magnetic shielding that largely isolates the main thruster plasma discharge from the thruster walls.

Figure 1B:
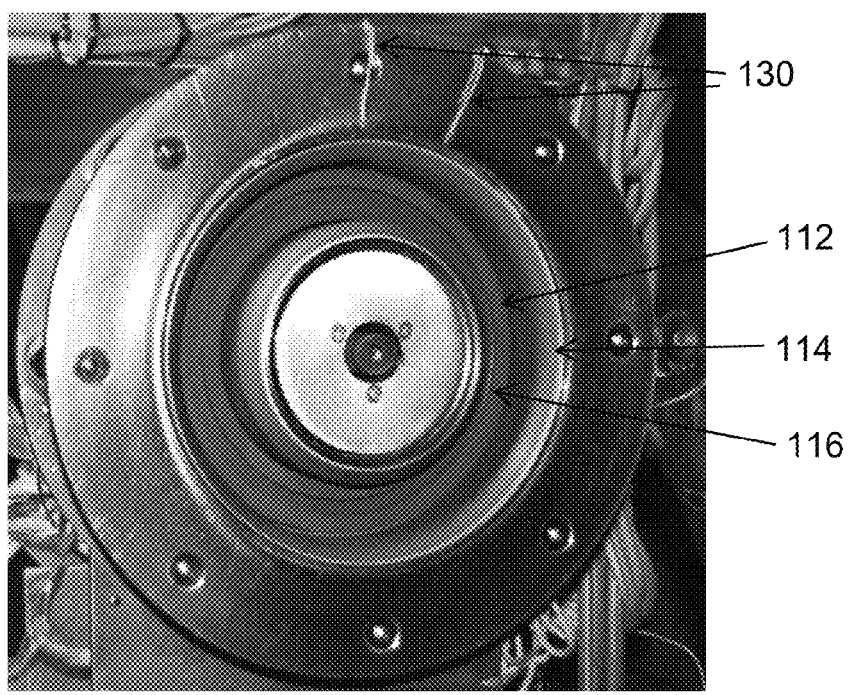
FIG. 1B is an image of a Hall thruster in the magnetically shielded configuration.
Figure 1C:
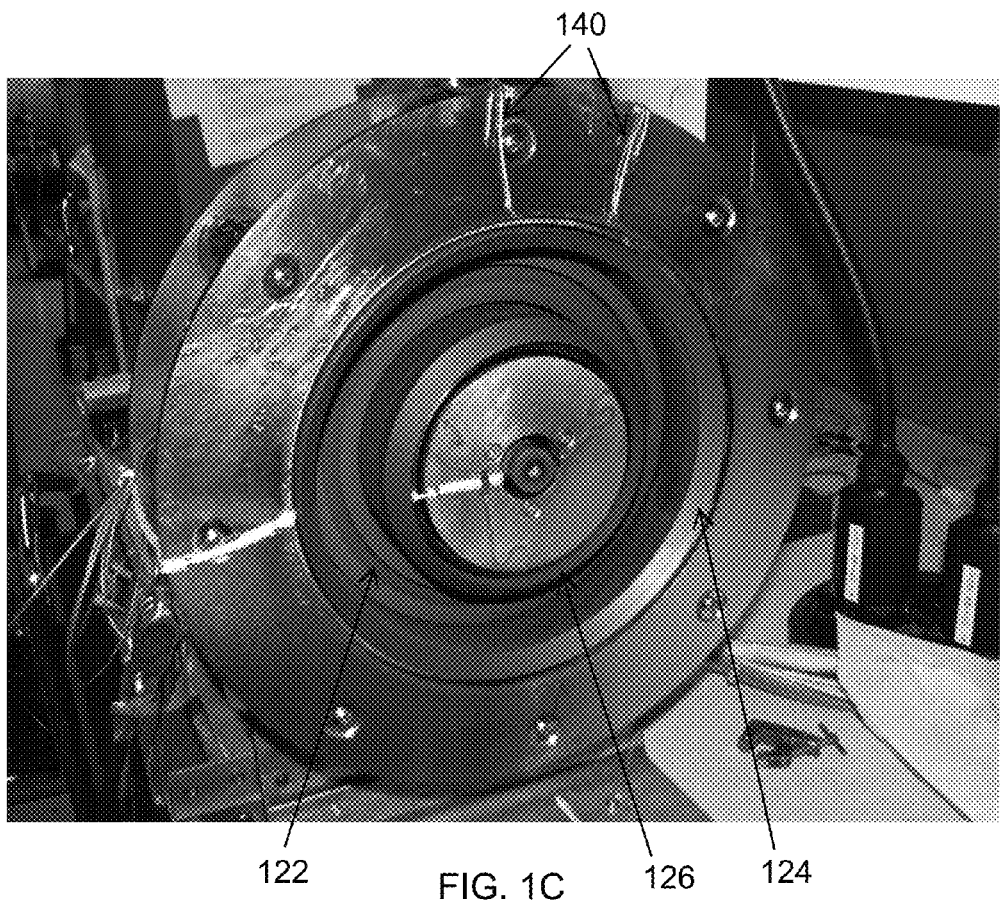
FIG. 1C is an image of a Hall thruster in the magnetically shielded configuration constructed entirely with graphite walls.

The three configurations of the H6 Hall thruster used for comparison are shown in FIG. 1A, FIG. 1B and FIG. 1C.

FIG. 1A is an image of a conventional Hall thruster, having an annular discharge chamber 102 with a non-conductive outer wall 104 and a non-conductive inner wall 106.

FIG. 1B is an image of a Hall thruster in the magnetically shielded configuration, having an annular discharge chamber 112 with a non-conductive outer wall 114 and a non-conductive inner wall 116. The magnetic shielding apparatus is powered by way of wires 130.

FIG. 1C is an image of a Hall thruster in the magnetically shielded configuration constructed entirely with graphite walls, having an annular discharge chamber 122 made of graphite, a graphite non-conductive outer wall 124 and a graphite non-conductive inner wall 126. The magnetic shielding apparatus is powered by way of wires 140.

Performance Data

Critical thruster performance data (total efficiency, discharge current, thrust, and Isp) were obtained for all three configurations shown in FIG. 1A, FIG. 1B, and FIG. 1C.

Figure 2A:
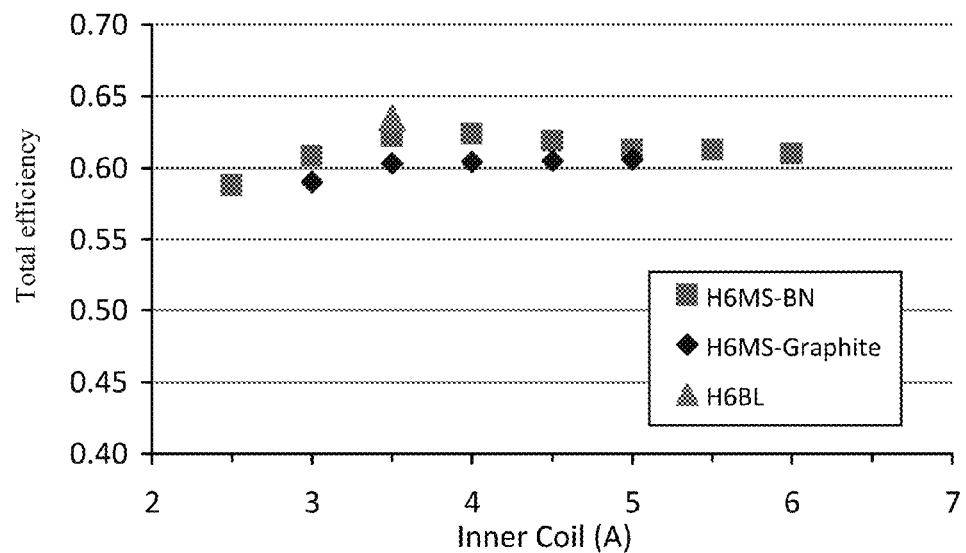
FIG. 2A is a graph of total efficiency for a conventional (baseline) Hall thruster built with BN components (triangle), a magnetically shielded Hall thruster built with BN (squares), and a magnetically shielded Hall thruster built with graphite walls (diamonds) versus inner coil current.

FIG. 2A is a graph of total efficiency for a conventional (baseline) Hall thruster built with BN components (triangle), a magnetically shielded Hall thruster built with BN (squares), and a magnetically shielded Hall thruster built with graphite walls (diamonds) versus inner coil current.

Figure 2B:
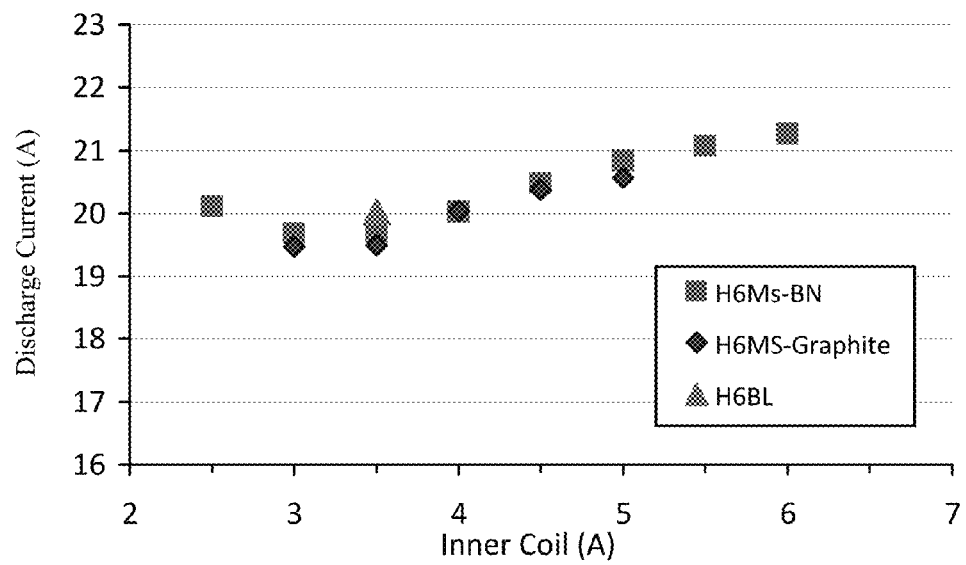
FIG. 2B is a graph of discharge current for a conventional (baseline) Hall thruster built with BN components (triangle), a magnetically shielded Hall thruster built with BN (squares), and a magnetically shielded Hall thruster built with graphite walls (diamonds) versus inner coil current.

FIG. 2B is a graph of discharge current for a conventional (baseline) Hall thruster built with BN components (triangle), a magnetically shielded Hall thruster built with BN (squares), and a magnetically shielded Hall thruster built with graphite walls (diamonds) versus inner coil current.

Figure 2C:
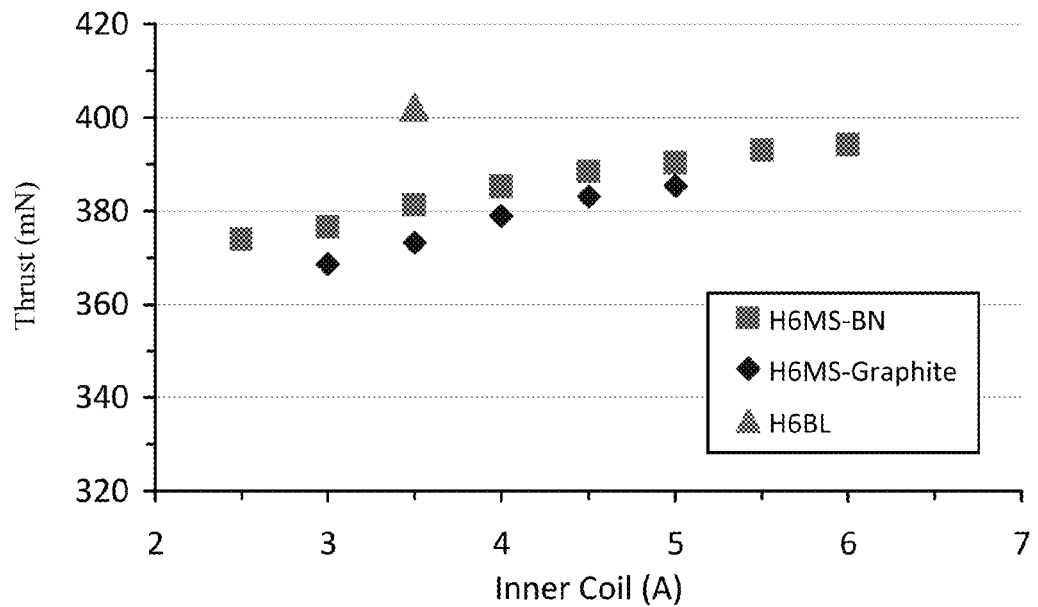
FIG. 2C is a graph of thrust for a conventional (baseline) Hall thruster built with BN components (triangle), a magnetically shielded Hall thruster built with BN (squares), and a magnetically shielded Hall thruster built with graphite walls (diamonds) versus inner coil current.

FIG. 2C is a graph of thrust for a conventional (baseline) Hall thruster built with BN components (triangle), a magnetically shielded Hall thruster built with BN (squares), and a magnetically shielded Hall thruster built with graphite walls (diamonds) versus inner coil current.

Figure 2D:
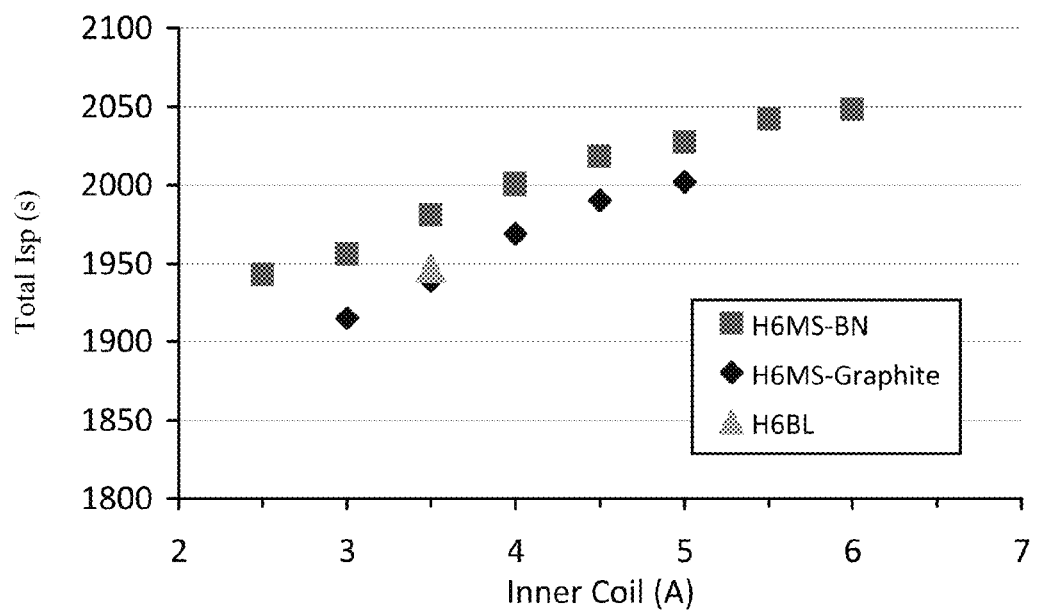
FIG. 2D is a graph of total Isp for a conventional (baseline) Hall thruster built with BN components (triangle), a magnetically shielded Hall thruster built with BN (squares), and a magnetically shielded Hall thruster built with graphite walls (diamonds) versus inner coil current.

FIG. 2D is a graph of total Isp for a conventional (baseline) Hall thruster built with BN components (triangle), a magnetically shielded Hall thruster built with BN (squares), and a magnetically shielded Hall thruster built with graphite walls (diamonds) versus inner coil current.

Plotting the performance results versus this coil current parameter illustrates the variation in performance with magnetic field strength near the exit plane, which is a design parameter in Hall thrusters. The magnetically shielded (MS) thruster has nearly the same efficiency (within 2%) as the baseline unshielded design, but the thrust is reduced and the Isp increased relative to the baseline performance. The thrust decrease was found to be due to plume divergence angle increases in the magnetically shielded configuration due to the field shape and movement of the plasma downstream by a few millimeters. The Isp increase was found to be due to a larger amount of higher ionized ions in the plume, which increase the ion velocity and therefore the Isp.

In the magnetically shielded Hall thruster, the rings/walls are near the anode potential, and not the cathode potential. The magnetic field is near zero at the anode. The channel depth is still longer than channel width. The acceleration zone is near the exit plane. This indicates that the magnetically shielded Hall thruster does not use an anode layer acceleration mechanism, and therefore it is not a thruster with anode layer (TAL).

This innovation could lead to higher power densities, because the thruster power level likely now limited by anode dissipation (radiation). Therefore, the entire channel can be made of one or more pieces of material at anode potential, thereby providing a large radiator. Graphite is such a material.

Replacement of the boron nitride rings with graphite reduced the efficiency by another 1 to 2%, with similar reductions in thrust. The slight difference between the graphite wall and the boron nitride is not considered significant.

Other Results

Figure 3:
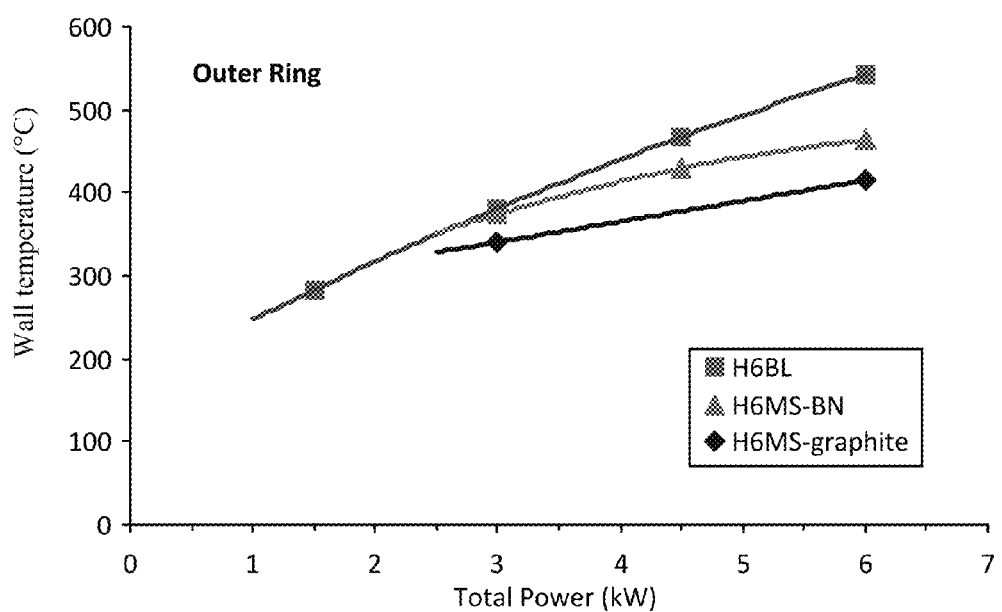
FIG. 3 is a graph of wall temperature a conventional (baseline) Hall thruster built with BN components (squares), a magnetically shielded Hall thruster built with BN (Triangles), and a magnetically shielded Hall thruster built with graphite walls (diamonds) versus total power.

A significant observation of the benefit of magnetic shielding and conductive wall made of graphite is the change in the thruster wall temperature in the three configurations. The wall temperature was measured during operation by a FLIR Inframetrics PM 380 Infrared Imaging System camera that was calibrated by observations of heated boron nitride and graphite samples placed in the test facility next to the thruster, and by thermocouples embedded into the rings. The temperature of the outer ring measured by the thermal camera as a function of total power into the H6 thruster for the three configurations is shown in FIG. 3. The inner ring temperature was found to be essentially the same as the outer ring. In the baseline unshielded case with boron nitride walls, the temperature of the outer ring increases from 291° C. at 1.5 kW to about 520° C. at 6 kW. The introduction of magnetic shielding reduces the boron nitride ring temperature at 6 kW to about 465° C. The reduction in the wall temperature with magnetic shielding is believed to be a result of reduced plasma bombardment of the wall. Installation of the graphite rings further reduced the wall temperature at 6 kW by an additional 50° C. to 415° C. This reduction is primarily attributed to the increased emissivity of graphite compared to boron nitride, which radiates the deposited power in the ring more efficiently.

Using the surface temperature measured by the camera, the emissivity of the material, and the surface geometry of the insert rings, wall, and anode, the radiated power for each of the rings in the three configurations can be calculated and is shown in Table 1.

TABLE 1

| Component | BL BN | MS BN | MS C |
|---|---|---|---|
| Anode | 91 W | 119 W | 111 W |
| Inner Ring | 297 W | 147 W | 119 W |
| Outer Ring | 310 W | 140 W | 110 W |
| Inner Wall | 98 W | 95 W | 98 W |
| Outer Wall | 229 W | 247 W | 258 W |
| Total Power | 1025 W | 748 W | 696 W |

By adding these values together, the total power radiated by the rings is calculated to be roughly 1025 W, 748 W, and 696 W for the H6 baseline Boron Nitride (H6BL-BN), H6 magnetically shielded Boron Nitride (H6MS-BN), and H6 magnetically shielded graphite (H6MS-graphite) configurations respectively at 6 kW of total input power. Thus, replacing the BN insert rings with graphite rings causes a reduction in power losses due to thermal radiation by roughly 32% and reduces the radiated power from the rings by more than a factor of 2 compared to the H6BL-BN configuration. Therefore the lower temperature of the graphite rings results from both a higher emissivity and a slightly lower power deposition from the plasma. It is posited that the temperature of the walls could be decreased further if the BN discharge chamber walls were also replaced with graphite in the H6MS configuration such that the total radiation area for deposition of power in the anode region is increased. Given this decrease in radiated power as well as the decrease in ring, wall, and anode temperatures at higher operating powers, it follows that the use of magnetic shielding techniques and graphite discharge chambers will likely result in a higher power density capability for future Hall thrusters of this design.

It is believed that this work represents a major advancement in Hall Thruster technology by the shielding of the walls from ion bombardment and erosion with specially shaped magnetic fields and then replacing the traditional ceramic walls with graphite. This advance greatly simplifies construction of the thruster required to withstand launch vibrations by eliminating large fragile ceramics and ceramic support structures, and will thereby lead to significant reductions in the thruster mass and cost. The new design could also lead to factors of two to three increase in the thruster power density, resulting in ultra-compact, very long life Hall thrusters for space missions. Finally, the magnetic shielding technology eliminates wall erosion at higher voltages, which also enables long life operation at higher Isp.

In a preferred embodiment, the profile of the wall of the thruster can be modeled using the Hall2De code. It is expected that it will be advantageous to provide initial Hall wall profiles that conform to the calculated "end-of-life" wall profiles that computations using the Hall2De code indicate will be produced if erosion were to be allowed to occur, so that the operation of the Hall thruster for its initial operation will be substantially invariant with time of operation from initial operation until the supply of gas available to the thruster is exhausted.

The significant advantages of this thruster design in long life, low cost and mass, and higher power density will also likely result in it replacing convention Hall thrusters for both deep space prime propulsion applications and commercial communications satellite station keeping applications.

Having described the demonstrated results of the metallic (or conductive) wall Hall thruster that has been constructed and operated successfully, we will now describe some of the underlying Hall thruster technology, for those who may not be expert in this field.

Figure 4A:
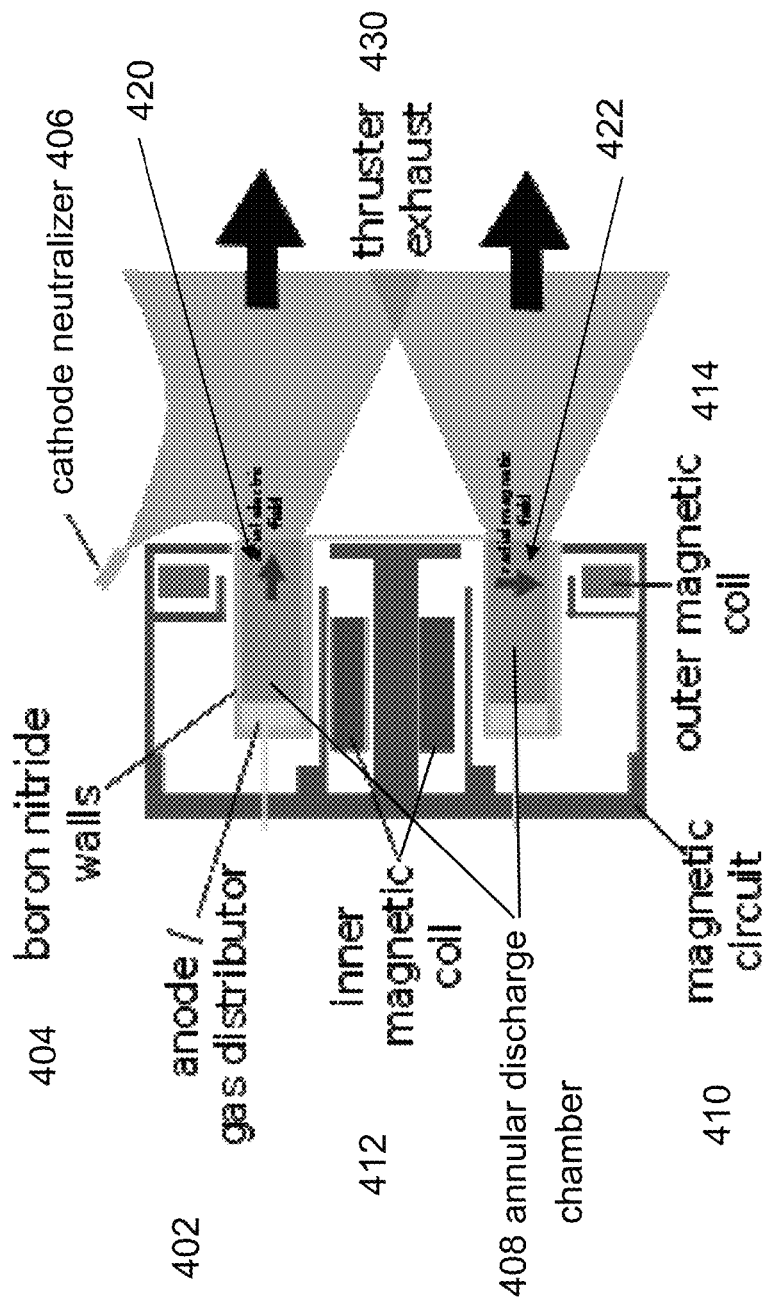
FIG. 4A is a schematic cross sectional diagram of a prior art Hall thruster design.

FIG. 4A is a schematic cross sectional diagram of a prior art Hall thruster design. The conventional Hall thruster operates in a reduced pressure environment, such as space in which charged particles can be generated by bombarding atoms with electrons. A Hall thruster typically uses a gas that can be ionized, such as Xenon, as the material that is accelerated by the thruster, which results in an equal and opposite acceleration experienced by the thruster (and the object to which it is attached). Xenon gas is used because of its high atomic weight and low ionization potential. Other materials that can be used as propellants include krypton, argon, iodine, bismuth, magnesium and zinc.

As illustrated in FIG. 4A, an annular discharge chamber 408 which typically is constructed with non-conductive walls 404, such as BN material, is provided with an anode/gas distributor 402 through which the gas is introduced into the thruster. The anode/gas distributor 402 is conductive and has an electrical terminal. A cathode neutralizer 406 that has an electrical terminal is provided, so that a voltage applied by a switchable power supply connected between the anode electrical terminal and the cathode electrical terminal can generate free electrons that are accelerated by an axial electric field 420. A magnetic circuit 410, such as a yoke made of a magnetic material, connects an inner magnetic coil 412 and an outer magnetic coil 414 so as to provide a radial magnetic field 422.

The electrons are constrained to move in a closed path by the relation E×B so that they are trapped in the vicinity of the exit plane of the thruster above the anode/gas distributor 402 and have a high probability of ionizing a gas atom. Since E (the electric vector 420) points axially and B (the magnetic vector 422) points radially (e.g., from the central post of the magnetic yoke that passes through the inner magnetic coil 412 to the portions of the magnetic yoke adjacent the outer magnetic coil 414, which would be radially outward, or in the opposite direction, which is radially inward), the vectorial cross product E×B results in a local resultant that is oriented in a tangential direction relative to the annular opening of the annular discharge chamber 408, which is either clockwise or counterclockwise as viewed along a central axis of the Hall thruster depending on the direction of B. Therefore, the electrons travel in circular path above the anode/gas distributor 402. Because the ionized gas atoms have much larger mass than the electron mass, they are not trapped by the magnetic field but are accelerated by the electric field, producing thrust as an exhaust plume 430. The gas ions pull an equal number of electrons with them, creating a plume with no net charge.

Figure 4B:
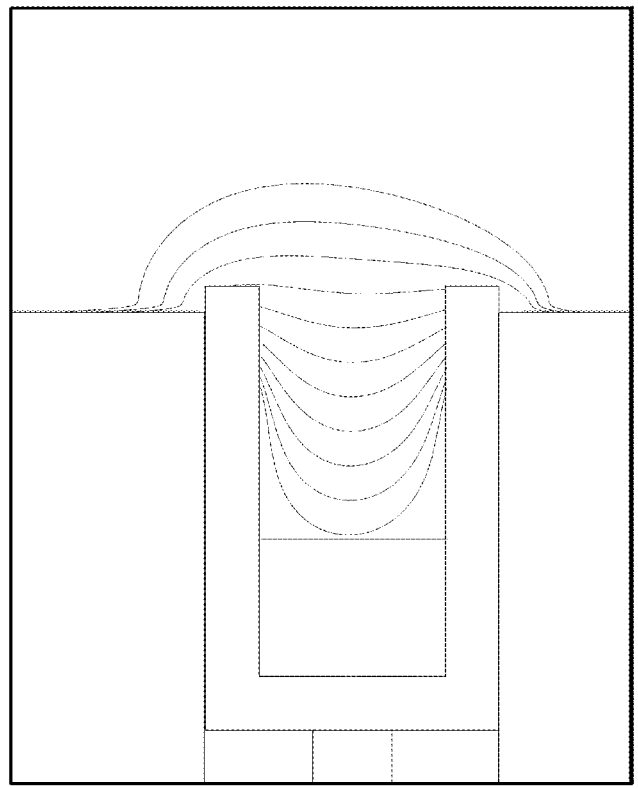
FIG. 4B is a schematic cross sectional diagram of a prior art Hall thruster design, showing the magnetic field lines present in an operating device.

FIG. 4B is a schematic cross sectional diagram of a prior art Hall thruster design, showing the magnetic field lines present in an operating device that does not include magnetic shielding.

Figure 5:
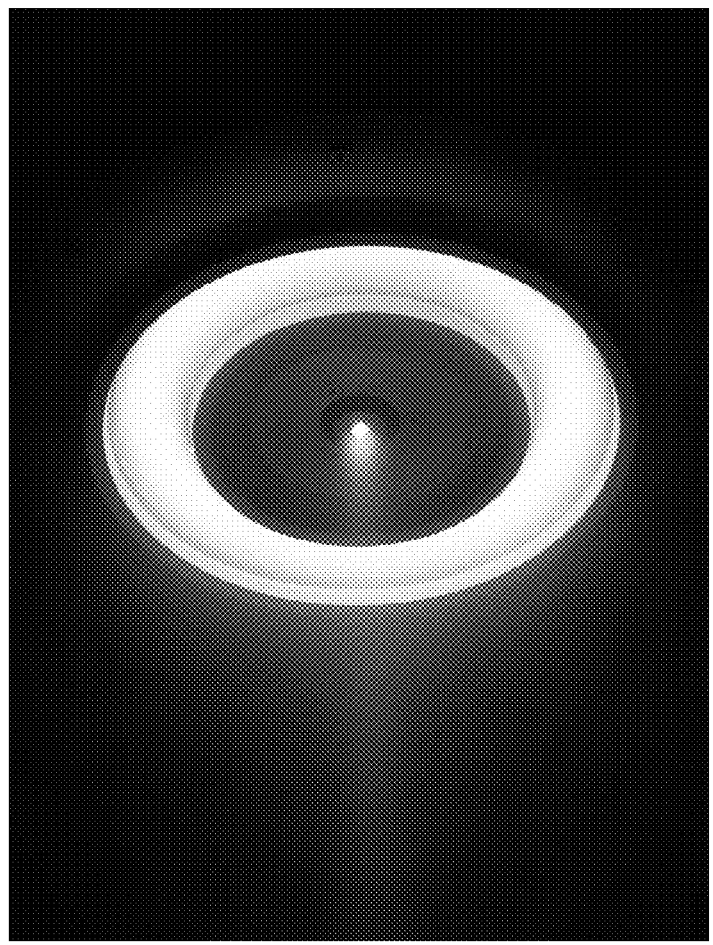
FIG. 5 is an image of a prior art Hall thruster in operation.

FIG. 5 is an image of a prior art Hall thruster such as that of FIG. 4A or FIG. 4B in operation.

Figure 6:
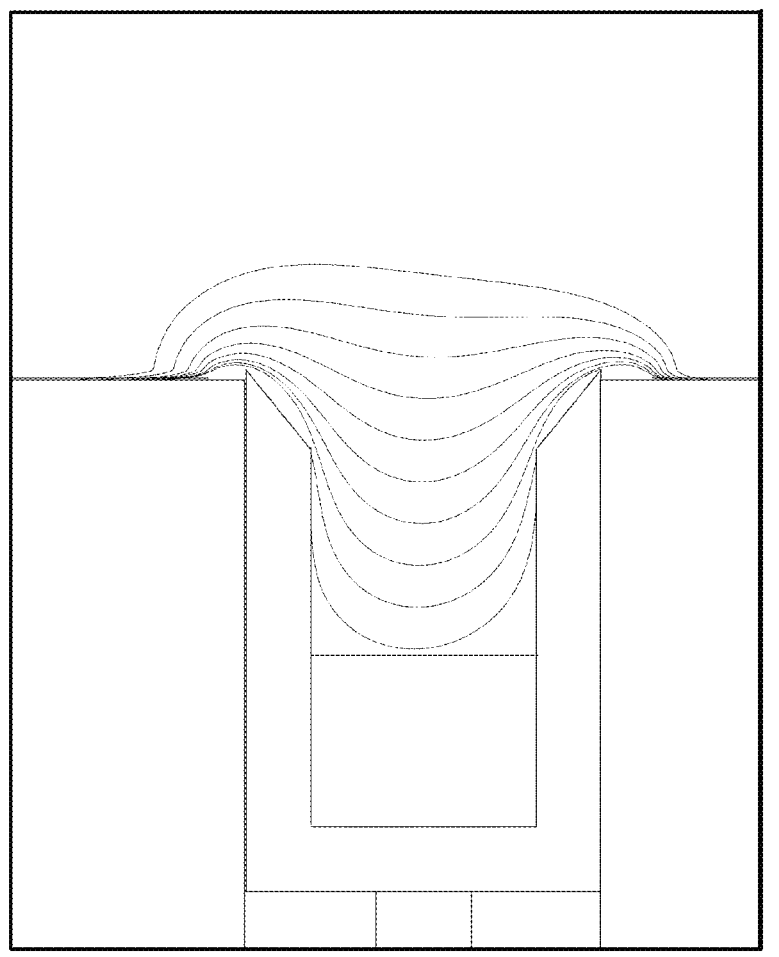
FIG. 6 is a schematic cross sectional diagram of a magnetically shielded Hall thruster design according to principles of the invention.

FIG. 6 is a schematic cross sectional diagram of a magnetically shielded Hall thruster design according to principles of the invention. The wall shape, profile, or cross section is fabricated in accordance with a calculated wall shape, a calculated profile, or a calculated cross section deduced using a code employing a magnetic field-aligned-mesh (MFAM) such as Hall2De.

Figure 7:
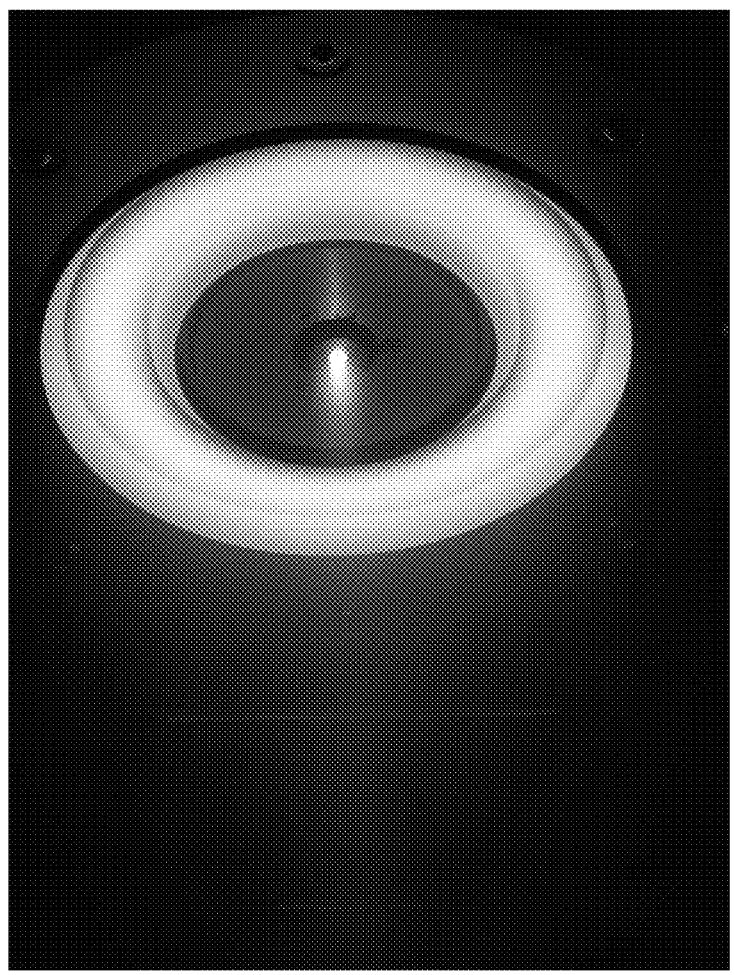
FIG. 7 is an image of a magnetically shielded Hall thruster in operation, showing the minimal interaction of the magnetic field lines with the wall.

FIG. 7 is an image of a magnetically shielded Hall thruster in operation, showing the minimal interaction of the magnetic field lines with the wall.

Figure 8:
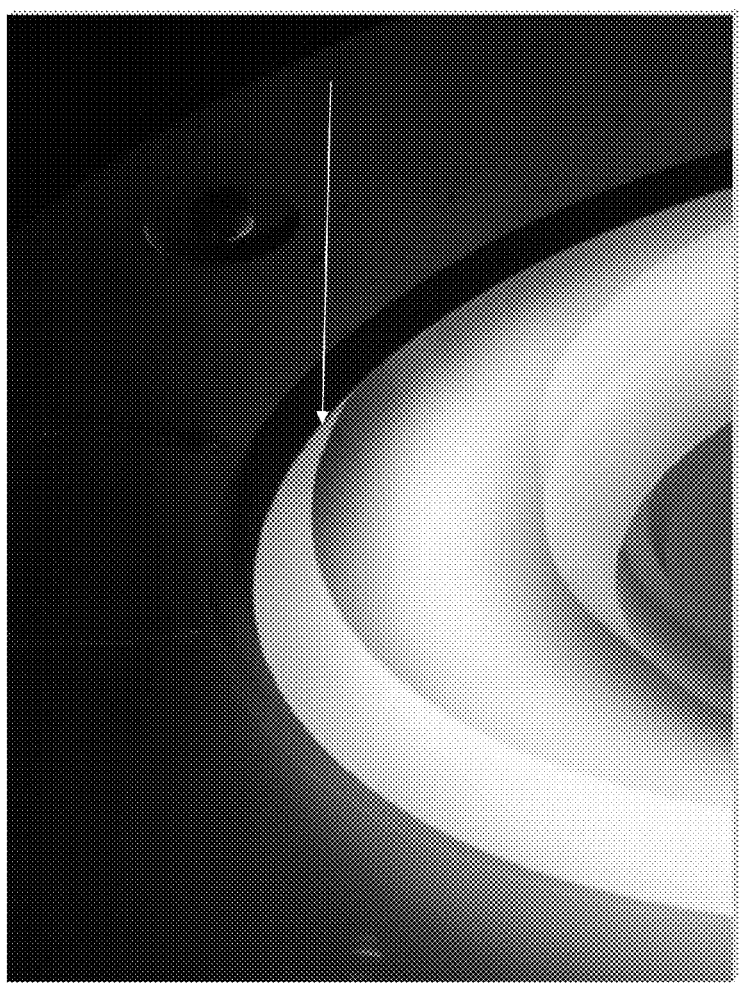
FIG. 8 is a close-up image of a magnetically shielded Hall thruster in operation, showing that the magnetic shielding holds the plasma off the wall, providing an unrestricted view along the wall to the anode.

FIG. 8 is a close-up image of a magnetically shielded Hall thruster in operation, showing that the magnetic shielding holds the plasma off the wall, providing an unrestricted view along the wall to the anode, as is indicated by the arrow.

Figure 9:
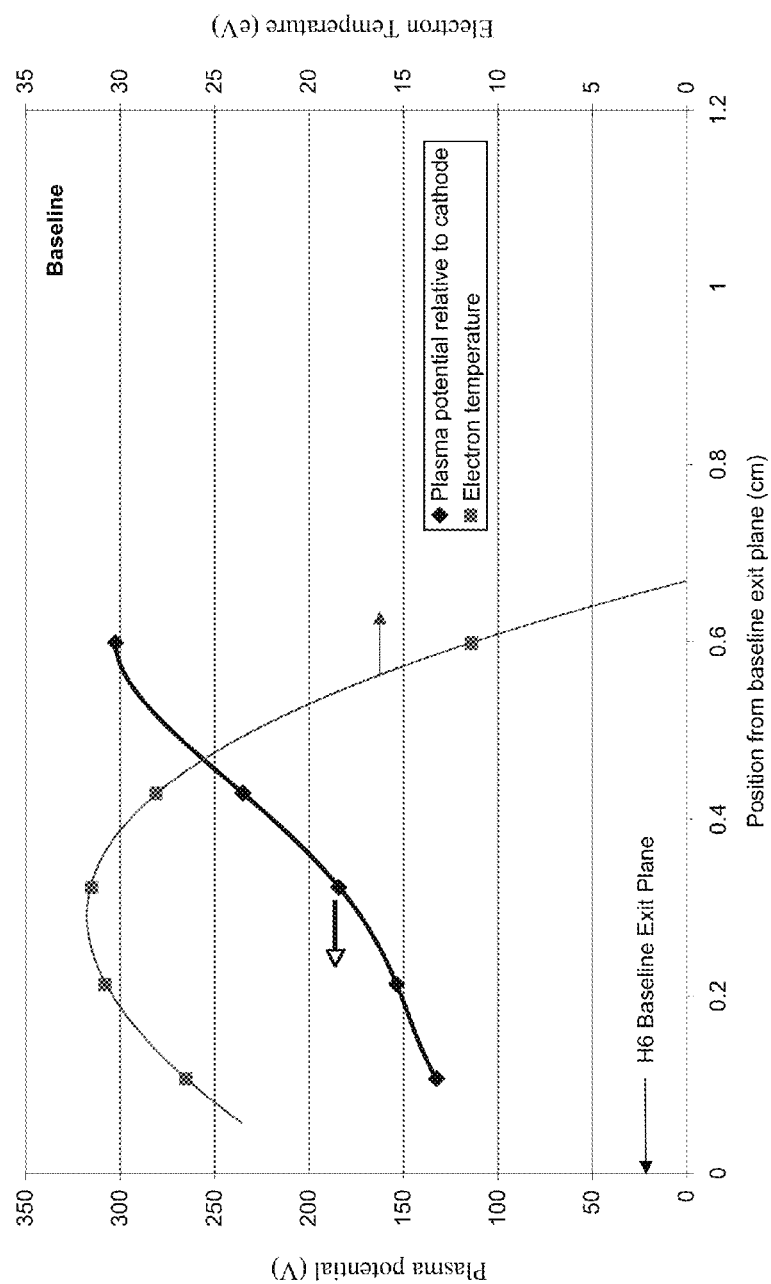
FIG. 9 is a graph of the operating parameters of the baseline configuration with high electron temperature (squares) and large potential drop (diamonds) along the wall surface.

FIG. 9 is a graph of the operating parameters of the baseline configuration with high electron temperature (squares) and large potential drop (diamonds) along the wall surface.

Figure 10:
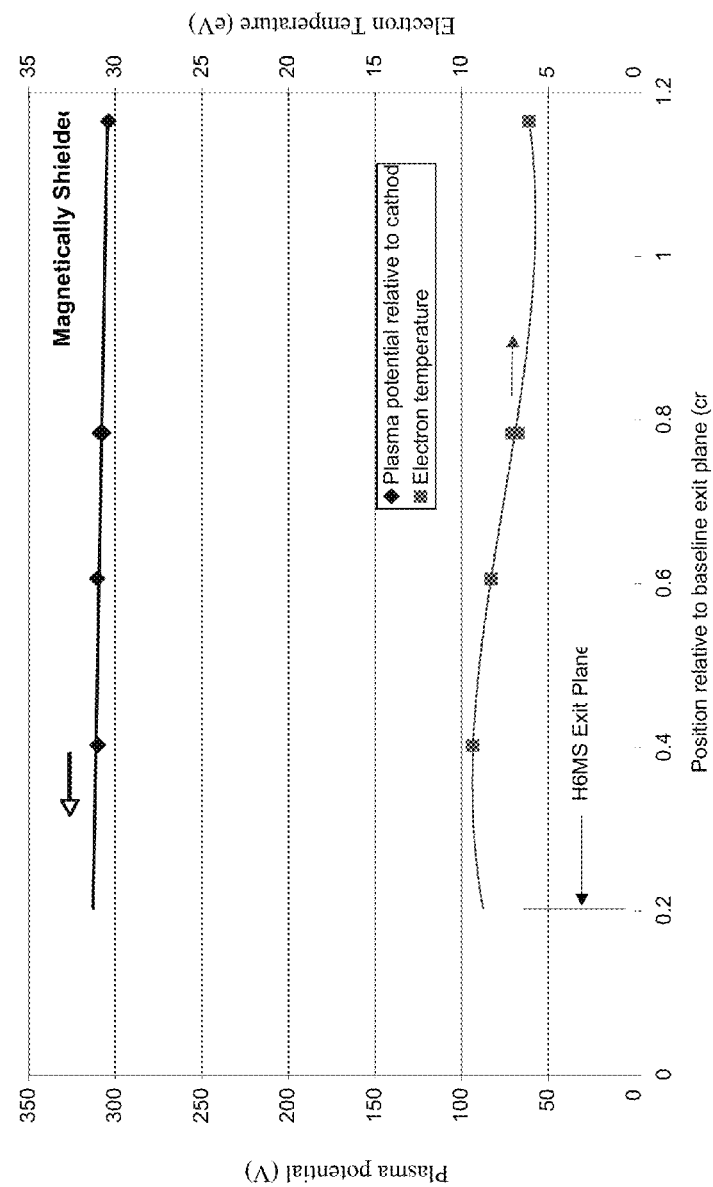
FIG. 10 is a graph of the operating parameters of the magnetically-shielded configuration with low electron temperature (squares) and constant potential (diamonds) along the wall surface.

FIG. 10 is a graph of the operating parameters of the magnetically-shielded configuration with low electron temperature (squares) and constant potential (diamonds) along the wall surface.

FIG. 11A is an image of an inner insulator ring from the baseline configuration, showing an eroded white region (~4 mm erosion band) at the edge of the ring.

FIG. 11B is an image of an inner insulator ring from the magnetically-shielded configuration showing a deposited black graphite conducting layer on the surface in contact with the plasma. The thruster performance was unaffected by the conducting rings, indicating that conducting walls, such as metallic walls or graphite walls, could be used.

Computation Methods

Figures 12A, 12B:
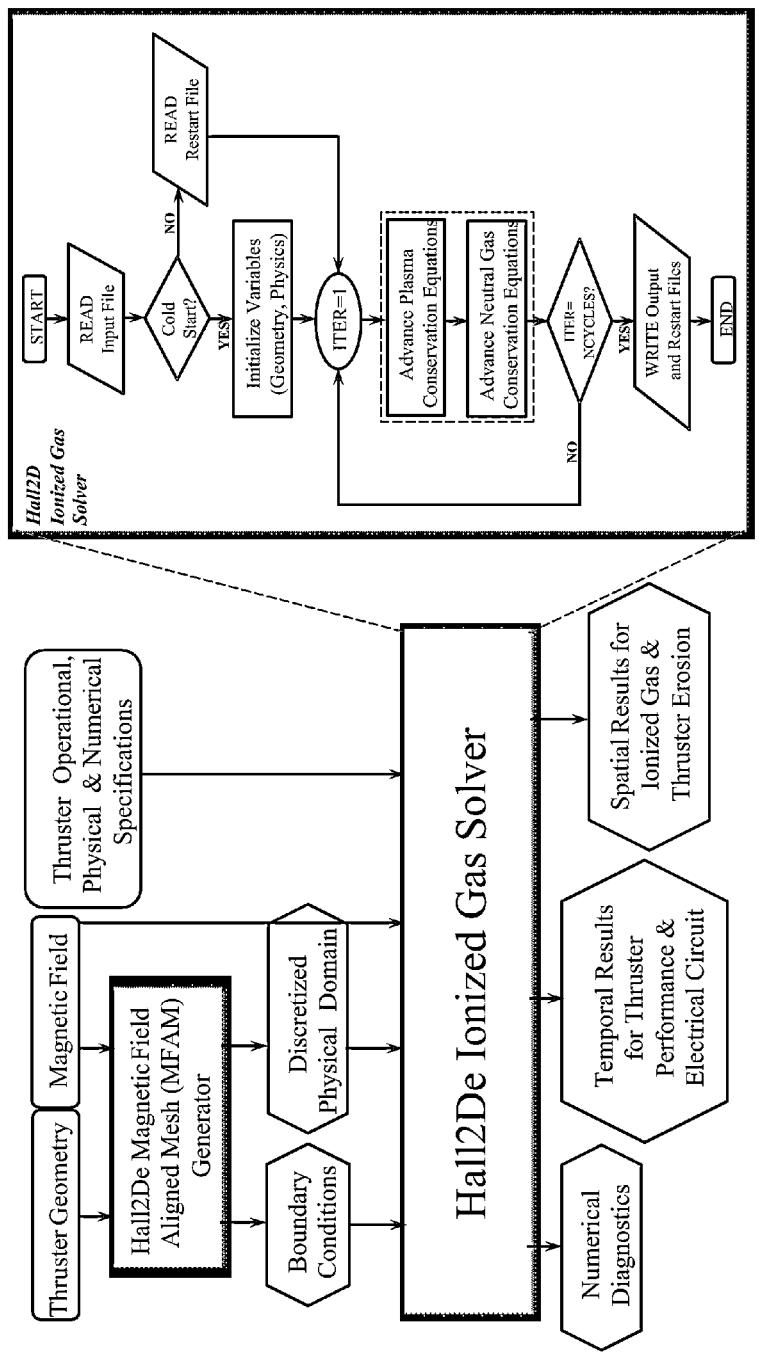
FIG. 12A is a high-level flow chart showing the relationships among the input parameters, the Hall2De code and the output results.
FIG. 12B is a flow chart showing the main components of the Hall2De code.

FIG. 12A is a high-level flow chart showing the relationships among the input parameters, the Hall2De code and the output results. FIG. 12B is a flow chart showing the main components of the Hall2De code. A more detailed discussion of the theory underlying the computation has been presented in co-pending U.S. provisional patent application Ser. No. 61/599,174, filed Feb. 15, 2012, and in co-pending U.S. provisional patent application Ser. No. 61/745,041, filed Dec. 21, 2012, which have been incorporated by reference, and which will become part of the public record when this application publishes and/or issues as a patent.

Given the voluminous description presented there, a brief summary will be presented here and the reader is directed to review the two provisional application documents.

As shown in FIG. 12A, the computation includes inputs for thruster geometry, the magnetic field, and thruster operational, physical and numerical specifications. Using the thruster geometry and the magnetic field, a magnetic field aligned mesh (MFAM) generator provides a specific coordinate system for the calculation. Using the specific coordinate system, boundary conditions are applied, and the physical domain of the thruster being modeled is generated.

The major distinctive features of Hall2De are: (1) discretization of all conservation laws on a MFAM, (2) numerical solution of the heavy-species conservation equations without invoking discrete-particle methods, so that multiple ion fluids can be included each being treated as an isothermal, cold (relative to the electrons) fluid accounting for the drag force and ion pressure gradient, the evolution of the (collisionless) neutral species is computed using line-of-sight formulations that account for ionization, and (3) a large computational domain that extends several times the thruster channel length in the axial direction and encompasses the cathode boundary and the axis of symmetry.

Discretization of all the conservation laws allows for the assessment of erosion in regions with complex magnetic field topologies. In regions of the thruster where isothermalization and thermalized equipotentialization of the lines of force persists, computational element would be subdivided into additional elements using an orthogonal set of lines. The equations are then solved on each one of these additional elements. The main advantage here is the ability to simulate regions of the thruster where surfaces have disrupted the lines of force. The MFAM also allows for the self-consistent simulation of the plasma in the near-anode region. No magnetic field streamline in this region of Hall2De need be identified upstream of which the conservation laws for the plasma are not solved self-consistently. Numerical solution of the heavy-species conservation equations without invoking discrete-particle methods eliminates the inherent statistical fluctuations typically caused by particle-based methods. A large computational domain allows for the investigation of the large-scale behavior of electrons in the plume while accounting for the cathode boundary conditions self-consistently.

The output from the Hall2De ionized gas solver include numerical diagnostics, temporal results for the thruster performance and for the electrical circuit, and spatial results for the ionized gas flow and thruster erosion. This last result allows one to determine geometries for components such as the anode walls that are expected to be "steady state" after long operation, and can allow modeling using the "steady state" geometries as input geometries to see if they will be essentially invariant with time of operation.

As shown in FIG. 12B, the Hall2De ionized gas solver reads an input file that describes what is to be computed, and determines whether it is doing a cold start or not. For a cold start, the variables for geometry and physics are initialized. If there is not a cold start, a restart file is read in, which allows the computation to pick up after a redetermined number of cycles have previously been performed. An iteration counter is set to 1 and increments at the end of each iteration. A computation cycle is performed in which plasma and neutral gas conservation equations are utilized. At the end of the cycle, a check for the number of iterations that have been performed is one, and if the number is less than a predetermined number, another calculation cycle is performed. When the predetermined number of iterations has been carried out, the output is written and a restart file is written. The calculation can then end. The computations are performed on one or more general purpose programmable computers running under the control of instructions recorded on a machine readable medium.

Figure 13:
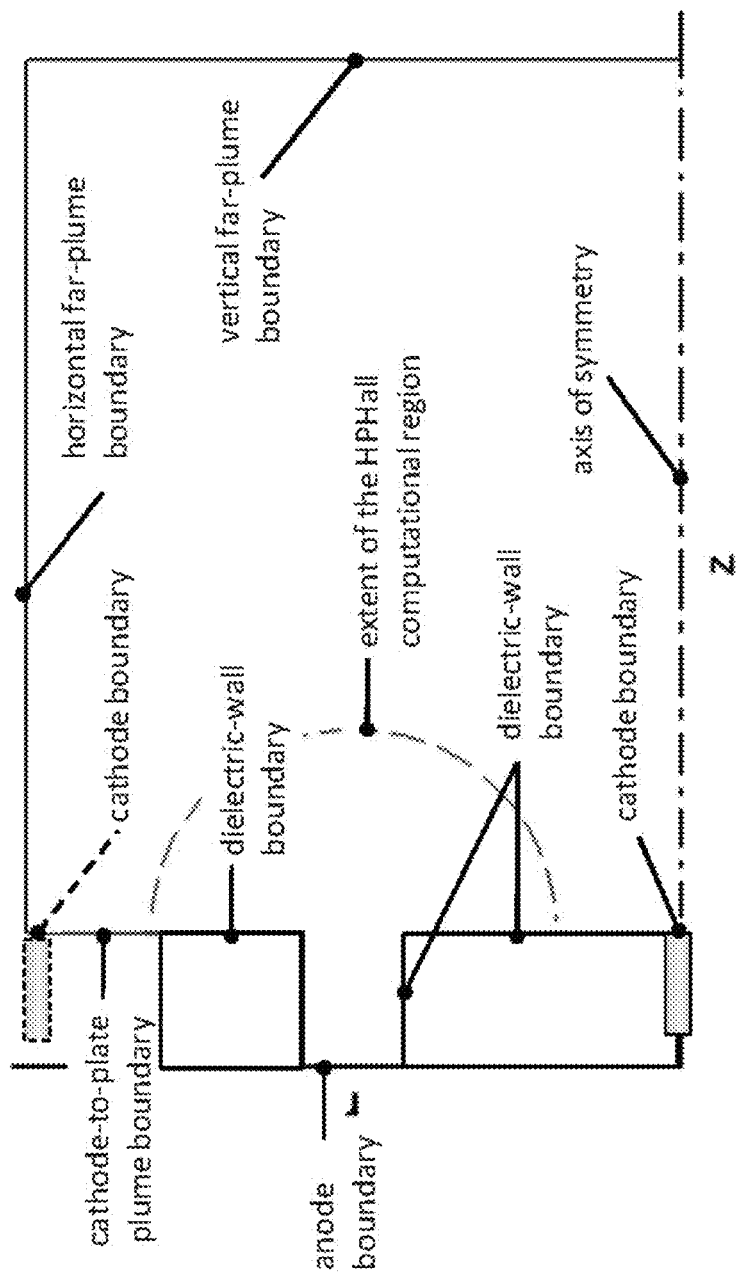
FIG. 13 is a diagram that illustrates the nomenclature used in performing Hall2De computations for a prior art thruster.

FIG. 13 is a diagram that illustrates the nomenclature used in performing Hall2De computations for a prior art thruster. In the diagram, a comparison to previous calculation methods, known as the HPHall method, is given. In FIG. 13, the walls adjacent the anode/gas distributor are indicated as being dielectric (non-conductive) walls. As has been described, computations for Hall thrusters having conductive wall (or metallic walls) have also been performed.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A Hall thruster, comprising:
   an annular discharge chamber having an inner wall, the entire inner wall being made of an electrically conductive material and having a rear surface with an aperture in the inner wall defined therein, said inner wall of said annular discharge chamber having a downstream end, a radially inner surface, and a radially outer surface, wherein said radially inner surface and said radially outer surface respectively radially inwardly and radially outwardly bound said annular discharge chamber, and wherein said radially inner surface diverges radially inwardly at said downstream end and wherein said radially outer surface diverges radially outward at said downstream end;
   an anode/gas distributor having an anode electrical terminal, said anode/gas distributor situated in said aperture defined in said rear surface of said annular discharge chamber, said anode/gas distributor having at least one inlet configured to receive an ionizable gas and configured to distribute said ionizable gas for use as a propellant;
   a cathode neutralizer configured to provide electrons, said cathode neutralizer having a cathode electrical terminal that can be connected to said anode electrical terminal by way of a power supply and a switch, said cathode neutralizer and said anode/gas distributor when operating generating an axial electrical field within said annular discharge chamber; and
   a magnetic circuit having a magnetic yoke, an inner magnetic coil and an outer magnetic coil, said magnetic circuit configured to be switchably powered, said magnetic circuit configured to provide a substantially radial magnetic field across an annular aperture of said annular discharge chamber, said magnetic circuit configured to provide magnetic shielding of said inner wall of said annular discharge chamber from charged particles.

2. The Hall thruster of claim 1, wherein said inner wall comprises graphite.

3. The Hall thruster of claim 1, wherein said inner wall comprises a metal.

4. The Hall thruster of claim 1, wherein said inner wall comprises a form of carbon other than graphite.

5. The Hall Thruster of claim 1, wherein erosion of the inner wall is prevented for at least 10,000 hours of operation.

6. The Hall thruster having a conductive wall of claim 1, wherein said ionizable gas is a gas selected from the group of gases consisting of xenon, krypton and argon.

7. The Hall thruster having a conductive wall of claim 1, wherein said ionizable gas comprises a vapor produced from an element selected from the group of elements consisting of bismuth, iodine, magnesium and zinc.

8. The Hall thruster of claim 1, wherein said inner wall has a wall shape, a profile, and a cross section, and wherein said inner wall is configured to provide a higher emissivity than a non-electrically conductive inner wall having the same shape, profile, and cross section.

9. The Hall thruster of claim 1, wherein said inner wall has a wall shape, a profile, and a cross section, d wherein said inner wall is configured to be of higher strength than a non-electrically conductive inner wall having the same shape, profile, and cross section.

10. The Hall Thruster of claim 1, wherein said rear surface is fabricated from graphite.

* * * * *